United States Patent [19]

Dyer et al.

[11] Patent Number: 4,751,942

[45] Date of Patent: Jun. 21, 1988

[54] MULTI-FUNCTION FUEL METERING VALVE

[75] Inventors: Gerald P. Dyer, Enfield, Conn.; Gerald J. Gorneault, Palm Harbor, Fla.; Charles F. Stearns, East Longmeadow, Mass.

[73] Assignee: United Technologies Corporation, Hartford, Conn.

[21] Appl. No.: 42,083

[22] Filed: Apr. 24, 1987

[51] Int. Cl.⁴ ............................................. F16K 31/12
[52] U.S. Cl. ................................. 137/599; 137/625.48
[58] Field of Search .......................... 60/39.281, 734; 137/599, 625.48, 625.6, 625.63, 625.64

[56] References Cited

U.S. PATENT DOCUMENTS

| | | | |
|---|---|---|---|
| 2,622,614 | 12/1952 | Cox | 137/500 |
| 2,700,872 | 2/1955 | Lee | 60/39.281 |
| 2,750,929 | 6/1956 | Bronson | 121/44 |
| 2,771,907 | 11/1956 | Joy | 137/625.63 |
| 3,060,969 | 10/1962 | Aslan | 127/625.63 |
| 3,332,436 | 7/1967 | Welty | 137/468 |
| 3,643,685 | 2/1972 | Hays | 137/501 |
| 3,724,494 | 4/1973 | Alber | 137/501 |
| 4,033,112 | 7/1977 | Schuster | 60/39.281 |
| 4,145,876 | 3/1979 | Stearns | 60/39.281 |
| 4,344,281 | 8/1982 | Schuster et al. | 60/39.281 |
| 4,422,475 | 12/1983 | Aspinwall | 137/625.48 |

FOREIGN PATENT DOCUMENTS 2347316  5/1974  Fed. Rep. of Germany .

Primary Examiner—Louis J. Casaregola
Attorney, Agent, or Firm—Lloyd D. Doigan

[57] ABSTRACT

A hybrid fuel metering system incorporating a multi-function control valve (18) is shown. The valve has a sleeve (96), a piston (98) mounted for translational movement within the sleeve and a spool (100) mounted for translational movement in the piston. The piston has three positions for cooperating with the sleeve; a variable first position for metering fuel to an engine (12), a second position for directing fuel to a metering valve (20) and a third position for shutting off flow to the metering valve and to the engine to correct engine overspeed. The spool has two positions a first position to shut off flow to the engine and to the metering valve to shut off the engine and a variable second position to position the piston to meter flow to the engine.

3 Claims, 6 Drawing Sheets

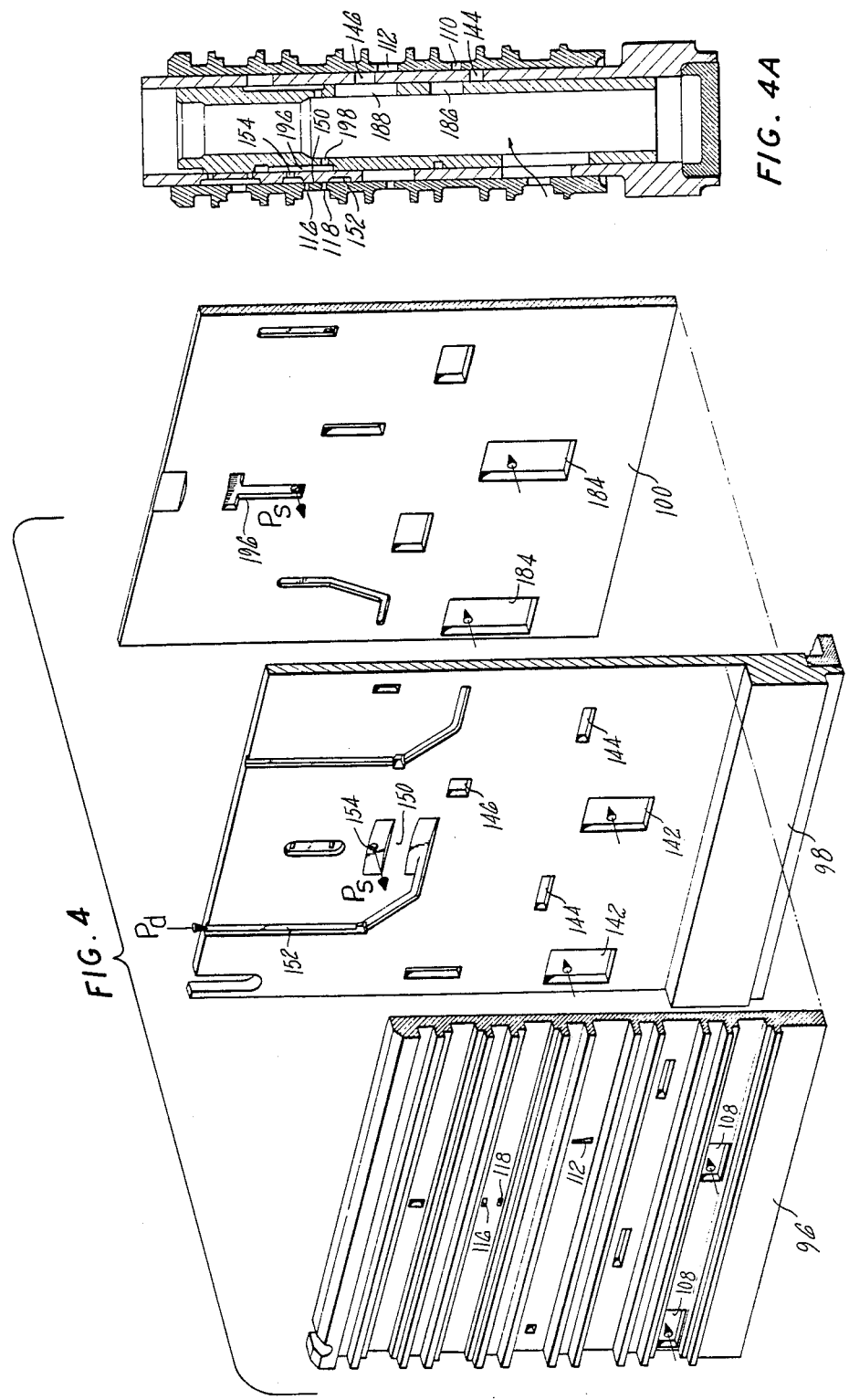

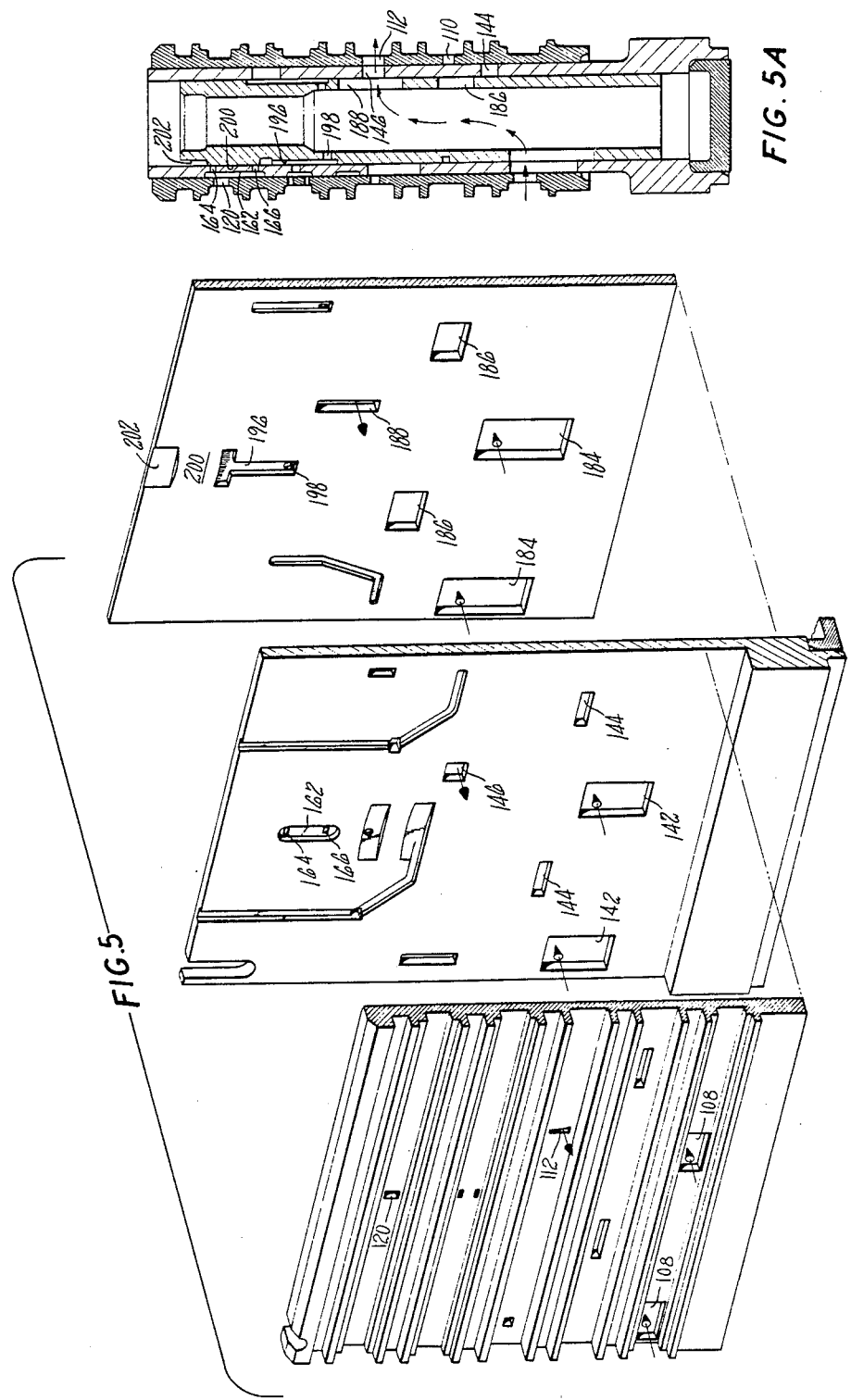

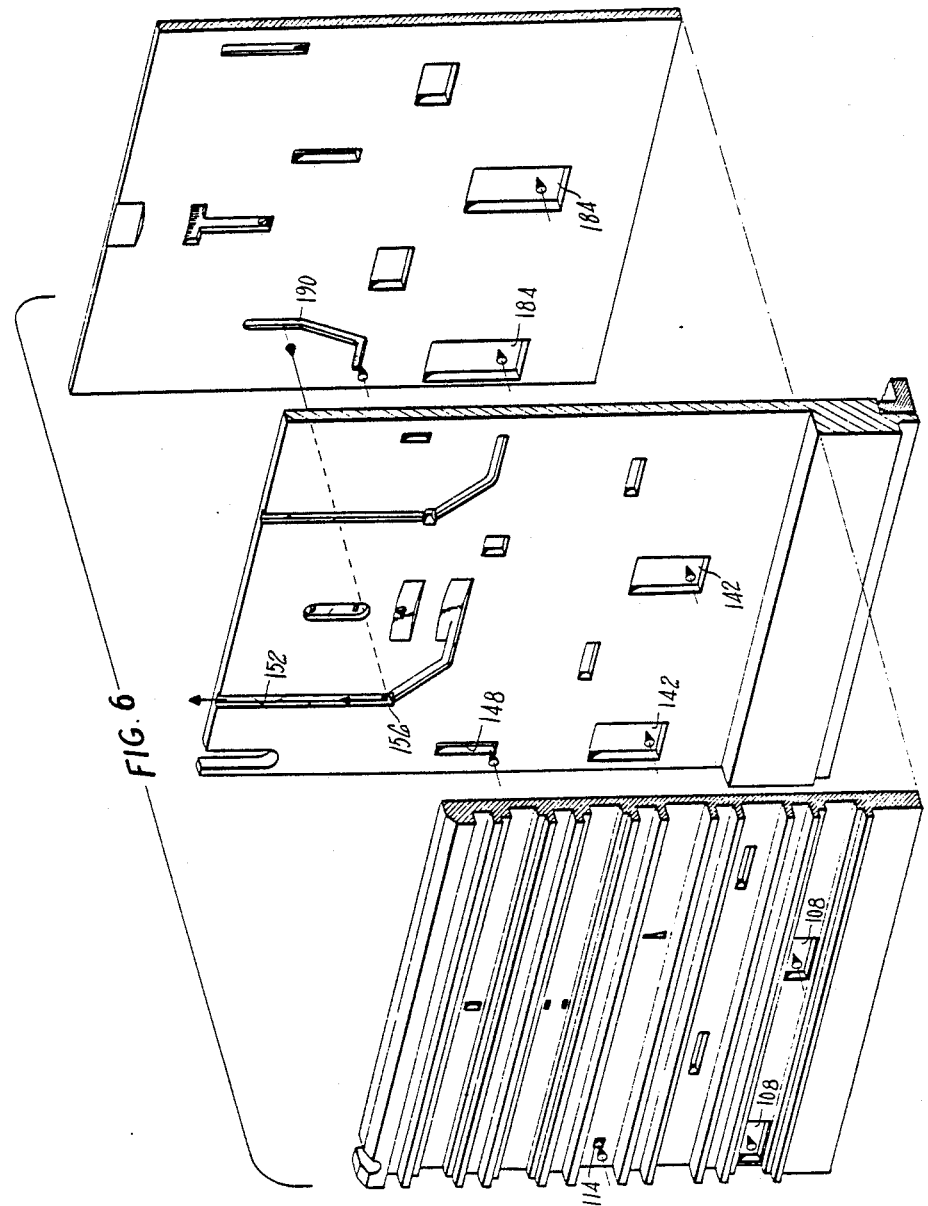

MULTI-FUNCTION FUEL METERING VALVE

CROSS REFERENCE TO RELATED APPLICATIONS

The subject matter hereof is also disclosed and some of it is claimed in a commonly owned copending U.S. Pat. application filed on even date herewith by Gerald P. Dyer et al, Serial No. 41,909 entitled HYBRID FUEL METERING SYSTEM.

DESCRIPTION

1. Technical Field

The present invention relates to a fuel metering valve for a gas turbine engine and more particularly to a fuel metering valve having a plurality of metering functions.

2. Background Art

Typically, fuel metering systems for gas turbine engines include an electronic engine control (EEC). The EEC instructs system components (such as valves) to meter fuel to the gas turbine engine as may be required. Some fuel metering systems, known as supervisory systems utilize an EEC to adjust a hydromechanical metering system to provide for the appropriate flight characteristics. Other fuel metering systems, known as hybrid systems, provide a hydromechanical back-up to the EEC to assume the fuel metering function, should the EEC fail or be disabled.

Hybrid fuel metering systems are generally complex including a set of valves controlled by the EEC and a set of valves controlled by the hydromechanical back-up. The EEC provides a signal to a first valve which meters fuel to the engine and provides a signal to a second valve which transfers the metering function to the hydromechanical back-up system should the EEC fail. The hydromechanical back-up system controls a third valve which meters fuel to the engine, a fourth valve which provides a minimum fuel flow to the engine should an engine overspeed condition exist and provides for a mechanical shut-off of the fuel to the engine.

Such hybrid fuel metering valving may be complex, costly, heavy and difficult to engineer. Other hybrid fuel metering valving is sought, and it is to this end that this invention is directed.

DISCLOSURE OF INVENTION

It is, accordingly, an object of the present invention to reduce the weight, bulk, complexity and the cost of hybrid fuel metering valve.

According to the invention, a fuel metering system is provided having a single valve which provides the hydromechanical fuel metering function, engine overspeed protection, fuel flow shutoff, and transfer of authority between the electronic engine control and the hydromechanical back-up systems.

The single valve consists of: a sleeve which receives fuel flow and meters the flow to an engine or directs it to a metering valve; a piston in fluid communication with the sleeve and which translates therein, and which assumes a variable first position to meter flow, a second position to direct flow to the metering valve, and a third position to stop flow to the metering valve and to the engine to correct overspeed; and a spool in fluid communication with the piston and which translates therein to position the piston in the variable first position to meter the flow to the engine.

The foregoing, and other features and advantages of the present invention, will become more apparent in light of the following detailed description and accompanying drawing.

BRIEF DESCRIPTION OF THE DRAWING

FIG. 4 is a plan view of the control valve of FIG. 2 in the engine overspeed mode;

FIG. 4a is a cross sectional view of the control valve of FIG. 4;

FIG. 5 is a plan view of the control valve of FIG. 2 in the transfer mode;

FIG. 5a is a cross sectional view of the control valve of FIG. 5;

FIG. 6 is a plan view of the control valve of FIG. 2 in the shutdown mode; and

FIG. 6a is a cross sectional view of the control valve of FIG. 6.

BEST MODE FOR CARRYING OUT THE INVENTION

Figure 1:
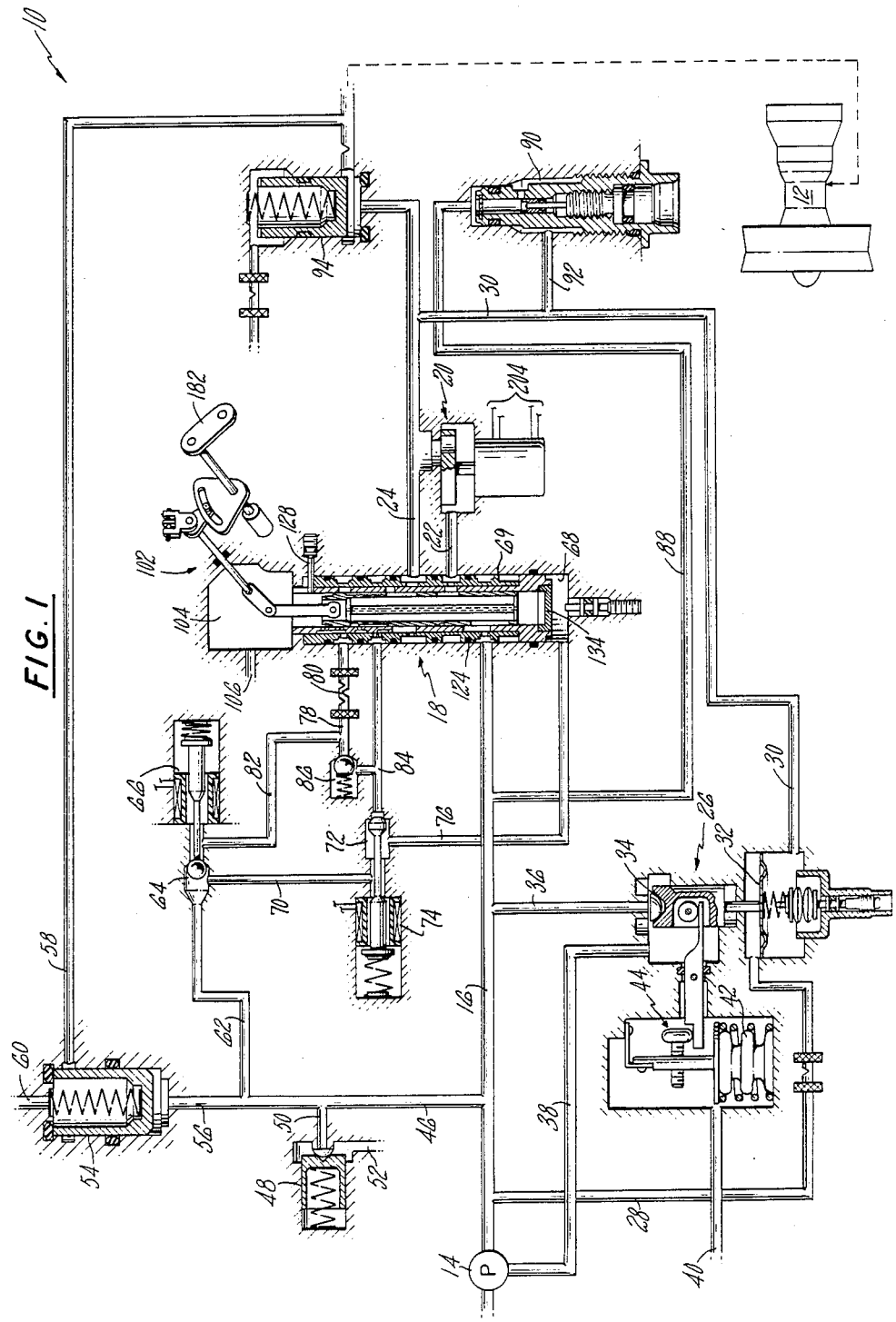
FIG. 1 is a perspective view of the control valve of the invention within a hybrid fuel.

Referring to FIG. 1, a hybrid fuel metering system 10 for a gas turbine engine 12 is shown. The fuel metering system is designed to provide fuel to the engine in either an electronic control mode (i.e., controlled by an EEC not shown) or, a mechanical backup control mode (i.e., hydromechanically controlled) via control valve 18. The mechanical back-up control mode is utilized if a failure occurs in the electronic control mode.

The Fuel Metering System

A pump 14 impels fuel through a supply line 16 at supply pressure to a control valve 18. The control valve then, depending on the mode of usage, sends the fuel flow to an engine electronic control (EEC) controlled metering valve 20 via line 22, or, if metering valve 20 is disabled, meters the flow of fuel through a metered line 24. The metering valve 20, which is described in detail in U.S. Pat. No. 4,637,420 to Dyer entitled "Metering Valve" and is incorporated by reference herein, controls the flow of fuel to the metered line. The fuel then flows through the metered line to supply fuel to the engine.

A pressure regulating valve (PRV) 26 controls the pressure drop across the control and metering valves. The pressure regulating valve (PRV) is described in detail in commonly assigned copending application Ser. No. 42,080 filed Apr. 24, 1987, to Robert H. Perkinson and Charles E. Reuter, entitled Variable Pressure Regulating Valve filed on even date herewith. The PRV compares the pressure of the fuel in the supply line 16 via sense line 28 with the pressure of the fuel in the metered line 24 via sense line 30 across a diaphragm 32. The diaphragm positions a valve 34 to port fuel from lines 16 and 36 through line 38 back to the pump 14. A constant pressure drop across the control valve 18 and metering valve 20 is maintained thereby. To provide the proper pressure drop across the metering valves for all altitudes, the pressure of the ambient air 40 is compared to a vacuum in chamber 42 to bias the PRV through linkage 44 to set the constant pressure drop across the metering valve 20 and the control valve 18 for the altitudes encountered.

A line 46 branches off the supply line 16. A high pressure relief valve 48 attaches to the line 46 via line 50. The high pressure relief valve ports fuel to drain line 52 if the pressure in the supply line exceeds a certain value, protecting system components thereby.

A manifold drain valve 54 branches off the sense line 46 via line 56. The manifold drain valve serves to empty an engine manifold (not shown) through line 58 if the pressure in line 46 drops below a prescribed value. The fuel is drained overboard from the manifold drain line 60.

Line 62 branches off the line 46 to port supply pressure to a first junction area 64 controlled by a transfer solenoid 66. The supply pressure may be ported to the bottom portion 68 of a valve chamber 69 (depending on the solenoid position) through the first junction area 64, through line 70, through a second junction area 72 controlled by an overspeed solenoid 74, and through a control line 76 as will be discussed infra.

Modulated pressure may be ported from the control valve 18 to the bottom portion 68 of the chamber 69 (depending on the position of the transfer solenoid), through line 78 which has a rate limiting orifice 80 therein, a line 82, first junction area 64, line 70, second junction area 72, and the control line 76, as will be discussed infra. Modulated pressure may also be ported to the bottom of the chamber through an overspeed line 84 and the second junction area 72 to the control line 76 (depending on the position of the overspeed solenoid). An overspeed check valve 86 connects the line 78 with the line 84, as will be discussed infra.

A line 88 branches off the supply line 16 to a minimum flow valve 90. The minimum flow valve allows a constant minimum flow to bypass the control valve 18 to correct engine overspeed as will be discussed infra. The minimum flow augments the output of control valve 18 and metering valve 20. Lines 88, 92 and 30, and minimum flow valve 90 form a bypass circuit as will be discussed infra.

A minimum pressure and shutoff valve 94 is located downstream of the sense line 30 in the metered line 24, as will be discussed infra.

The Control Valve

Figure 2:
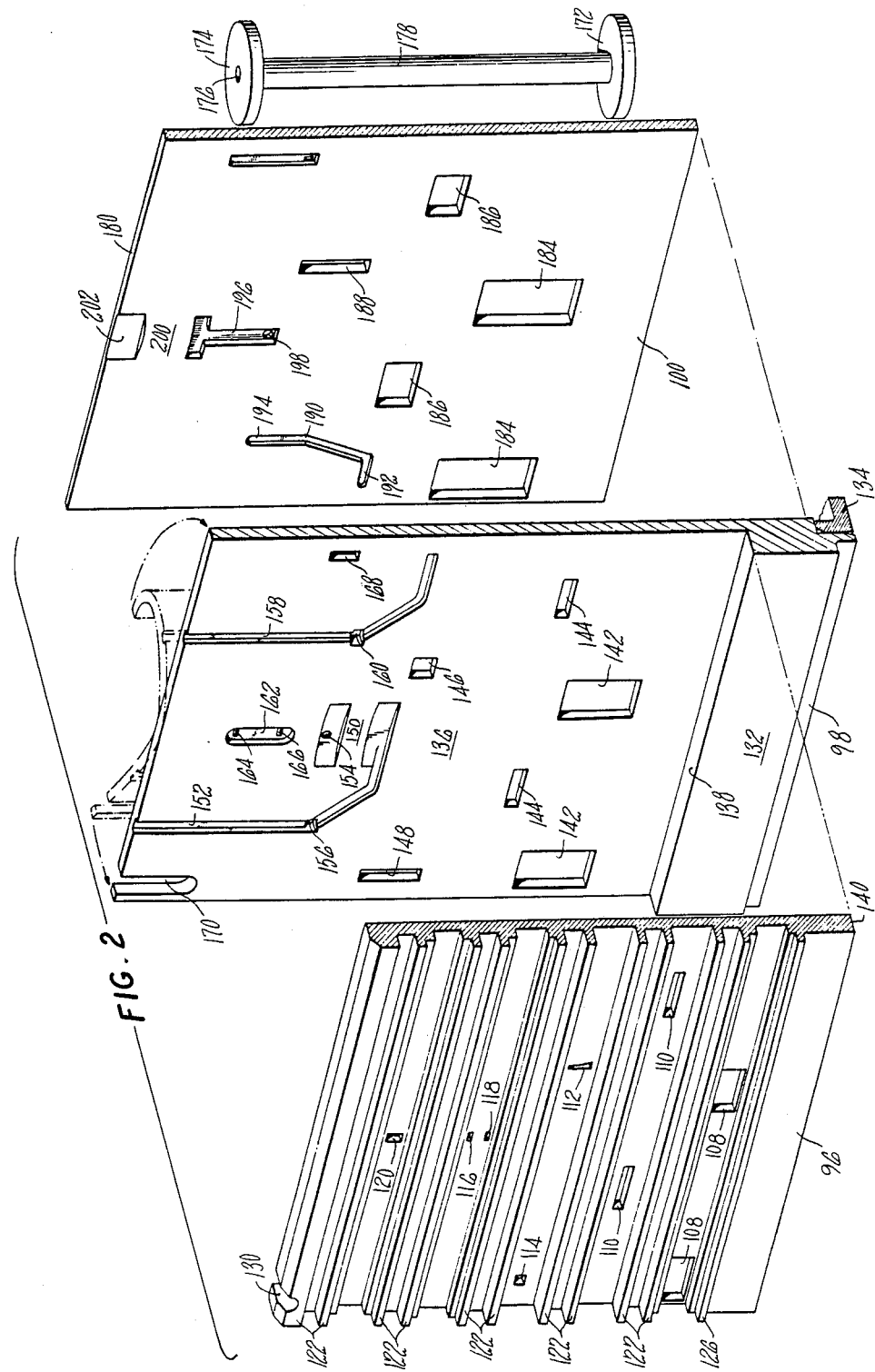
FIG. 2 is a plan view of the control valve of FIG. 1.

Referring to FIG. 2, details of the valve are shown. In FIGS. 2-6, normally cylindrical portions of the valve are shown in plan view, that is, as if the valve was cut along its length and then laid flat (see the phantom lines in FIG. 2). In FIGS. 2a-6a the valve is shown, as assembled, in cross section. The valve has four main parts; a sleeve 96, a piston 98, a spool 100, and a pilot lever linkage 102 (shown in FIG. 1).

The sleeve 96 of the valve 18 is supported within the generally cylindrical chamber 69 within the housing of the fuel metering system. A top portion 104 of the chamber is connected to a drain via line 106 and is therefore at drain pressure. The bottom portion 68 of the chamber receives supply pressure or modulated pressure to position the piston 98 as will be discussed infra.

The sleeve 96 has a plurality of openings communicating with the lines of the fuel metering system and with ports of the piston. A pair of supply openings 108 communicate with the supply line 16. A pair of EEC openings 110 communicate with line 22 to supply fuel to the metering valve 20. A manual opening 112 supplies metered fuel to the metered line 24. A shutdown opening 114 communicates with the metered line 24 as will be discussed infra. A supply opening 116 and a drain opening 118 communicate with the overspeed line 84. A transfer opening 120 communicates with the line 78.

The sleeve has a plurality of pairs of lands 122 which serve to isolate the fluid flow of each respective line. An o-ring 124 (see FIG. 1) is placed between each pair of lands to further isolate the fluid flow of each respective line. Land 126 is designed to allow fuel to flow thereabouts to allow supply pressure to act on the piston as will be discussed infra.

Pin 128 (see FIG. 1) is anchored to the housing and mates with slot 130 within the top edge portion of the sleeve to prevent the sleeve from rotating within the housing.

The piston 98 which translates within sleeve 96, has a head portion 132 (see FIG. 2) which is sealed by plug 134 and a hollow barrel portion 136. The barrel portion has a plurality of ports and grooves communicating with the sleeve openings and with spool windows and grooves (as will be described infra). A shoulder 138 of the head portion is designed to abut a bottom surface 140 of the sleeve.

A pair of piston supply ports 142 communicate with the supply openings 108 of the sleeve 96. A pair of EEC ports 144 communicate with the EEC openings 110 of the sleeve. A manual port 146 communicates with the manual opening 112. A shutdown port 148 communicates with the shutdown opening 114. An overspeed land 150 directs drain pressure from the shutdown groove 152 (which communicates drain pressure from the top of the chamber 104) to the drain opening 118 or ports supply pressure from the supply pressure port 154 to the supply opening 116. A shutdown drain port 156 communicates with the shutdown groove 152, as will be discussed infra. A groove 158 and a port 160 are provided to equalize pressure about the piston to prevent the piston from torquing. A transfer groove 162 communicates with the transfer opening 120. Either drain pressure or supply pressure is provided to the transfer groove via output ports 164 and 166. A port 168 is provided to provide equal pressure across the piston balancing the supply pressure in output port 164 and supply pressure port 154 across the piston. Slot 170, which mates with the pin 128, allows the piston to translate within the sleeve without rotating relative thereto.

The spool 100 is cylindrical having a plurality of windows communicating with the ports of the piston. The spool is sealed by a first disk 172 at a lower end and a second disk 174 contiguous the upper end. Each disk has a cylindrical opening 176 at its midpoint. A hollow tube 178 joins each disk about its opening. The tube allows drain pressure from the top of the chamber 104 to be ported to the bottom of the spool within the piston. Since the pressure on both ends of the spool is equalized the force needed to manipulate the spool is minimized. The second disk is recessed from the top end 180 (see FIG. 1) of the spool to allow the pilot lever linkage to connect to the spool.

A linkage 102 shown generally in FIG. 1 connects a pilot lever 182 to the spool 100. Such linkages, which are well known in the art, respond to rotation of the pilot lever to position the spool.

The spool has a pair of supply windows 184 communicating with the supply ports 142. A pair of EEC windows 186 communicate with the EEC ports 144. A manual window 188 communicates with the manual port 146. A shutdown groove 190 communicates with the shutdown port 148 at a first portion 192 and with the shutdown drain port 156 at a second portion 194. A T-shaped groove 196 communicates supply pressure via a supply window 198 to either of the supply pressure ports 154 or the output port 166. A manual land 200 is normally positioned between the output port 164 and the output port 166. A drain groove 202 communicates drain pressure from the top 104 of the chamber 69.

Operation

FIGS. 3a-6a are shown without the disks 172, 174 and tube 178 for ease of illustration. It should be understood that with the disks and tube in place, no fuel escapes from the spool to go to drain through chamber 104, or provides a fluid pressure force upon the plug 134 of the piston.

Referring to FIG. 1, in the electronic mode of operation, the transfer solenoid 66 is positioned to allow supply pressure to be ported via a first circuit consisting of line 46, line 62, the first junction area 64, line 70, and the control line 76 to act on the plug 134 end of the piston 98. The supply pressure upon the relatively large area of the plug 134 end of the piston overwhelms the supply pressure acting on the relatively small area of the piston shoulder 138 to push the piston up against the bottom surface 140 of the sleeve 96.

Figures 3, 3A:
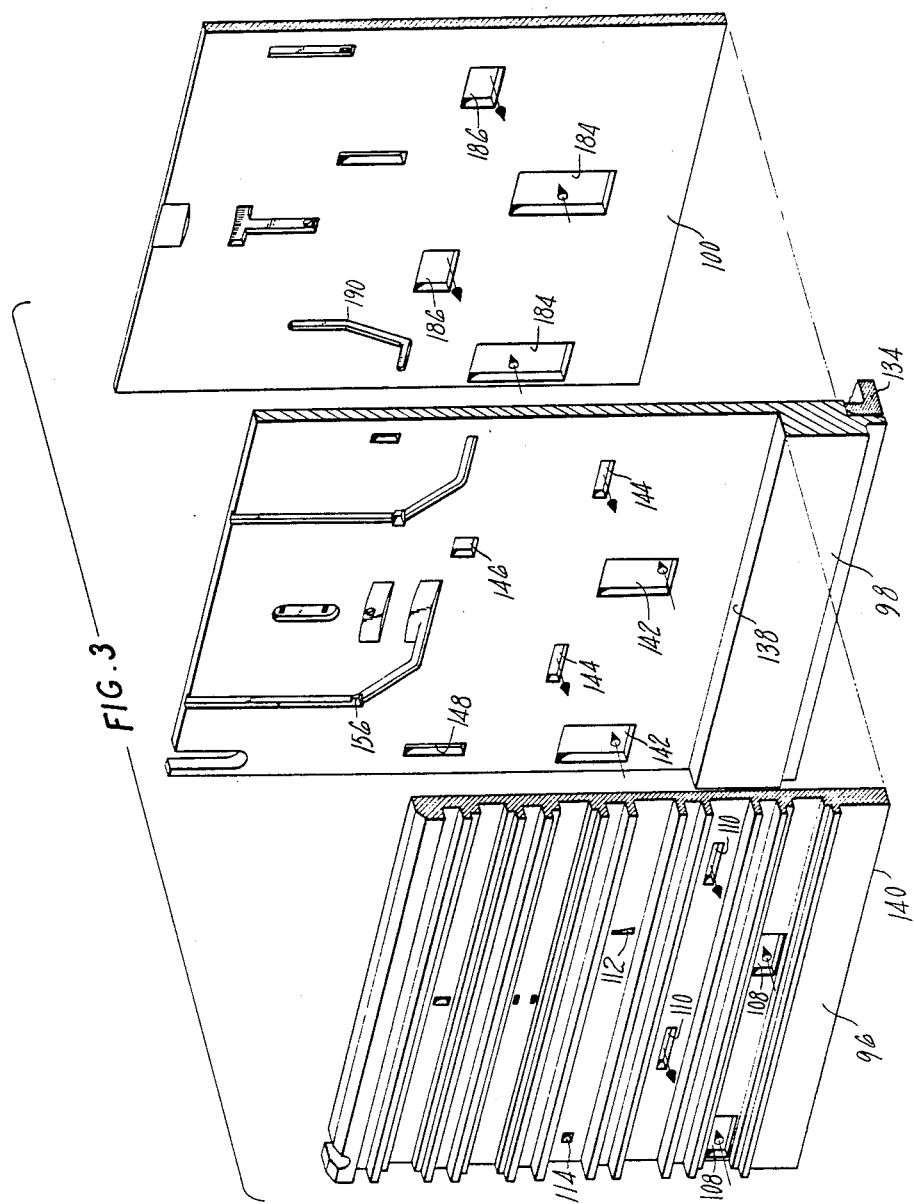
FIG. 3 is a plan view of the control valve of FIG. 2 in the EEC mode.
FIG. 3a is a cross sectional view of the control valve of FIG. 3.

Referring to FIGS. 1, 3, and 3a with the piston shoulder abutting the sleeve, fuel is ported from the supply line 16, through the supply openings 108 in the sleeve, the supply ports 142 in the piston, and in the windows 184 of the spool. Fuel is then vented from the interior of the spool through the EEC window 186 of the spool, the EEC ports 132 of the piston, and the EEC openings 110 of the sleeve to the line 22. Fuel enters the metering valve 20 which is controlled by an electronic engine control unit (not shown) via electrical connecting lines 204. Metered fuel is directed by the metering valve to the metered line 24 for delivery to the engine.

With the piston shoulder 138 abutting the bottom surface 140 of the sleeve 96, the manual port 146 of the piston and the manual opening of the sleeve 112 do not align so that all the fuel from the metering valve 20 is directed towards the engine. In this position (see FIG. 3), the shutdown opening 114 and the shutdown port 148 are in alignment. However, the shutdown groove first portion 192 of the spool does not align with the shutdown port 148 of the piston. This ensures that the fuel flow from the metering valve does not escape through the control valve 18 and substantially all the metered flow from the metering valve is delivered to the engine.

Referring to FIGS. 1, 4, and 4a if the engine 12 experiences an overspeed condition, the overspeed solenoid 74 is positioned in the second junction area 72 to close the connection between line 70 and 76, precluding the supply pressure from positioning the piston, and to open the connection between a second circuit consisting of lines 76 and 84. Modulated pressure is directed to the plug 134 end of the piston from the overspeed openings 116, 118 of the sleeve 96 through the line 84, to line 76. The modulated pressure on the plug end of the piston balances with the supply pressure on the piston shoulder 138 to position the piston within the sleeve as shown in FIGS. 4 and 4a. The overspeed land 150 of the piston ports pressure to the supply opening 116 and the drain opening 118 thereby positioning the piston to correct engine overspeed. Should the piston be in too high a position to correct overspeed, drain pressure is directed through the shutdown groove 152 to the drain opening 118 thereby lowering the position of the piston. Conversely, if the piston is too low within the sleeve, supply pressure is ported from supply window 198 and groove 196 in the spool to the supply pressure port 154 in the piston through the supply opening 116 which is directed to the plug 134 end of the piston to move the piston back up. After a short time, the piston tends to stabilize in a position which corrects engine overspeed. In this position, the spool alignment with the piston is irrelevant as the piston has shutoff communication between both the EEC ports 144 and the EEC openings 110 and the manual port 146 and the manual opening 112 of the sleeve respectively. No fuel flow exits the control valve 18 to either the metered line 24 or to the metering valve 20. The minimum flow valve 90 (see FIG. 1) within the bypass circuit allows a certain amount of fuel to flow from line 16 to line 88, to line 92, to sense line 30, and to the metered line 24. This amount of fuel allows the engine to operate safely until the overspeed condition abates. When the overspeed condition no longer exists, the overspeed solenoid is repositioned to allow the supply pressure to flow to the head end of the piston thereby moving the piston back against the sleeve to allow fuel flow to the metering valve 20.

Referring to FIG. 1, if the EEC senses that the metering valve 20 has failed or is failing, the transfer solenoid 66 is positioned in the first junction area 64 closing fluid communication between lines 62 and 70 and opening fluid communications between lines 70 and 82. Supply pressure from line 62 no longer pushes the piston shoulder against the sleeve. Pressure is modulated on the plug of the piston via a third circuit consisting of the manual line 78, line 82, line 70 and control line 76. The pilot manipulates the pilot lever thereby moving the linkage which causes the spool 100 to translate within the piston 98.

Referring to FIGS. 5 and 5a, in the manual mode the piston follows the movement of the spool to meter fuel through the manual port 146 and the manual opening 112 of the sleeve by modulating pressure on the plug of the piston. If the spool is moved downwardly, the manual land 200, which is normally positioned to shut flow to the output ports 164, 166, moves downwardly allowing drain pressure from chamber 104 to enter the transfer groove 162 via groove 202 and output port 164. The drain pressure is communicated from the groove 162 through the transfer opening 120, and through the aforementioned lines to the head end of the piston lowering the piston until the manual land is positioned to shut flow to the output ports 164, 166. Similarly, if the spool 100 is moved upwardly, supply pressure, through the supply window 198 and the supply pressure groove 196, is directed to the output port 166 and the transfer groove 162 which is directed through the transfer opening 120 to the head end of the piston to move the piston upwardly. By positioning the piston, the piston manual port 146 is moved relative to the sleeve output opening 112 thereby metering fuel to the metered line 24.

Referring to FIG. 1, the rate limiting orifice 80 delays the response of the piston to movement of the pilot lever 182. If the rate limiting orifice is not included, adjustments in the setting of the power lever would result in immediate increases or decreases of fuel flow through the control valve 18 to the engine 12, thereby effecting a corresponding immediate increase or decrease in engine speed. The immediate response in fuel flow to adjustments in the power lever setting is not always desirable, particularly when the power lever is advanced quickly from an idle setting towards a maximum power setting, thereby causing the flow through the control valve to increase from a minimum to a maximum. Maximum fuel flow delivered to the engine while the engine is at a relatively low speed and low airflow may result in a fuel/air mixture that is too rich for safe engine operation. Conversely, reducing fuel flow rapidly may cause the engine to receive a fuel/air mixture that is too lean for safe engine operation. By including a rate limiting orifice in the manual line 78, the rate limiting orifice delays the modulated presure provided by transfer opening 120 from quickly aligning the piston with the spool such that the manual land shuts off the output ports 164, 166. By slowly moving the piston into alignment with the spool, the desired alignment of output port 146 with output opening 112, and therefore the desired rate of fuel flow, is delayed.

In the manual mode (i.e. when the control valve meters fuel), the EEC port 144 of the piston and the EEC opening 110 of the sleeve do not align. As before, the shutdown drain groove first portion 192 does not align with the shutdown port 148 of the piston so that essentially all of the fuel metered through the manual output opening 112 of the sleeve is directed to the metered line 24 and to the engine 12.

The position of the spool upon the occurrence of an overspeed condition, even in the manual mode, is irrelevant. The overspeed land in the piston controls the position of the piston because the modulated pressure from the manual pilot land cannot flow from line 70 to line 76 due to the position of the overspeed solenoid.

When the transfer solenoid is positioned to transfer control from electronic engine control to the pilot lever (manual mode), the piston 98 will tend to move downwardly because of the relatively high supply pressure acting on the piston shoulder and the relatively low drain pressure acting on the piston head end via the transfer solenoid opening 120, output port 164 and drain pressure groove 202. Therefore, when the piston moves downwardly, it tends to push the fuel in the control line 76, the line 70, and the manual line 82 out through the control valve to drain. However, the rate limiting orifice limits the flow to drain. Limiting the flow to drain is a problem because the proper flow may not be quickly metered through the control valve to the engine. To allow the piston to reach its desired manual position quickly upon a transfer from the EEC mode to the manual mode, the overspeed check valve 86 is provided to allow the fuel escaping from behind the piston to travel through the overspeed line 84 to drain through the control valve not only through the transfer opening 120 but through overspeed opening 118, and the shutdown groove 152, effectively bypassing the rate limiting orifice. As the piston 98 moves to the manual position, overspeed land 150 shuts off fluid communication through line 84 and drain opening 118 to shutdown groove 152. The piston is now in the manual mode and operation continues as detailed above. In the manual mode, supply pressure is ported through supply opening 116 into line 84 to ensure that the overspeed check valve 86 remains closed.

Referring to FIGS. 1, 6, and 6a in a shutdown situation the spool 100 is pulled by the pilot lever and linkage to an uppermost position within the piston. Flow between the manual window 188, the manual port 146 and the manual opening 112 is closed. Similarly, flow between the EEC window 186, the EEC port 144 and the EEC window 110 is closed. As in an overspeed condition, there is no flow through the metered line or the metering valve. The fuel flow, however, from minimum flow valve 90 must be diverted to shut down the engine. As seen best in FIG. 6, the shutdown opening of the sleeve 114, the shutdown port of the piston 148, the shutdown groove 190 of the spool, and the shutdown drain port 156 of the piston are now in alignment. The flow from the minimum flow valve flows back to the control valve 18 via metered line 24 and through the control valve via the shutdown opening 114, the shutdown port 148, the shutdown groove 190, the shutdown drain port 156 and the shutdown groove 152 to drain through the upper portion 104 of the chamber 69. As a result, pressure in the metered line 24 drops thereby activating the minimum pressure shutoff valve 94 to shut off fuel to the engine 12.

It should be understood that the invention is not limited to the particular embodiments shown and described herein, but that various changes and modifications may be made without departing from the spirit and scope of the invention as defined by the following claims.

We claim:

1. A valve for controlling a flow of fuel from a source to a gas turbine engine characterized by:
   a sleeve means for receiving said flow and for communicating said flow to a metering valve and for metering said flow to said engine;
   a piston means in fluid communication with said sleeve means and mounted for translational movement therein for cooperating with said sleeve means, having a variable first position within said sleeve means to meter said flow to said engine, having a second position within said sleeve means for communicating said flow to said metering valve, and having a third position within said sleeve means for stopping said flow to said metering valve and to said engine to correct engine overspeed; and
   a spool means in fluid communication with said piston means and mounted for translational movement therein, for positioning said piston means within said variable first position within said sleeve means to meter said flow to said engine, said piston means following said translational movement of said spool.

2. The valve of claim 1 further characterized by:
   said spool means being further mounted for translational movement within said piston means for stopping said flow to said metering valve and to said engine to shut off said engine.

3. A valve for controlling the flow of fuel from a source to a gas turbine engine comprising:
   a sleeve having a first opening for receiving fuel from said source, a second opening for communicating metered fuel to said engine and a third opening for communicating said fuel to a metering valve;
   a piston disposed within said sleeve for translational movement therein, said piston having a first port for receiving said fuel from said first opening, said piston being translatable to a variable first position for communicating metered fuel with said second opening to said engine, to a second position for communicating fuel through said third opening to said metering valve, and to a third position to correct engine overspeed; and a spool disposed within said piston for translationsal movement therein and having a window for receiving fuel from said port, said spool being translatable to a variable first position for positioning said piston means to communicate metered fuel in cooperation with said second opening to said engine and to a second position for shutting off fuel flow to said engine.

* * * * *